United States Patent
Yamashita

(10) Patent No.: US 8,779,049 B2
(45) Date of Patent: *Jul. 15, 2014

(54) OUTER CASING AND METHOD FOR PRODUCING THE SAME

(71) Applicant: Panasonic Corporation, Osaka (JP)

(72) Inventor: Takehiko Yamashita, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/649,804

(22) Filed: Oct. 11, 2012

(65) Prior Publication Data

US 2013/0035450 A1 Feb. 7, 2013

Related U.S. Application Data

(63) Continuation of application No. PCT/JP2011/004906, filed on Sep. 1, 2011.

(30) Foreign Application Priority Data

Feb. 24, 2011 (JP) ................................ 2011-038070

(51) Int. Cl.
| | | |
|---|---|---|
| *C08K 3/34* | (2006.01) | |
| *C08J 3/22* | (2006.01) | |
| *C08F 292/00* | (2006.01) | |
| *C08F 297/02* | (2006.01) | |

(52) U.S. Cl.
USPC ............ 524/443; 524/451; 524/577; 524/789

(58) Field of Classification Search
CPC ...... C08K 3/34; C08K 3/22; C08K 2201/014; C08K 2201/018; C08L 67/04; C08L 101/16; H05K 5/02; B29C 45/0053
USPC .......... 524/77, 115, 261, 354, 357, 399, 400, 524/413, 442, 451, 508, 577, 599, 789, 443
See application file for complete search history.

(56) References Cited

U.S. PATENT DOCUMENTS

| | | |
|---|---|---|
| 1,963,245 A | 6/1934 | Pier |
| 2,470,410 A | 5/1949 | Nelson |
| 3,050,472 A | 8/1962 | Morrell |
| 3,345,319 A | 10/1967 | Colgan et al. |
| 4,317,742 A | 3/1982 | Yamaji et al. |
| 4,339,555 A | 7/1982 | Ohmura et al. |
| 4,525,529 A | 6/1985 | Ohmura et al. |
| 5,011,893 A | 4/1991 | Miyamoto et al. |
| 5,153,269 A | 10/1992 | Greenlee et al. |
| 5,180,787 A | 1/1993 | Shorr et al. |
| 5,219,921 A | 6/1993 | Gomyo |
| 5,883,222 A | 3/1999 | Yanagisawa et al. |
| 6,368,586 B1 | 4/2002 | Jacob et al. |
| 6,432,869 B1 | 8/2002 | Krause et al. |
| 6,960,626 B2 * | 11/2005 | Takekoshi et al. ............ 524/789 |
| 2001/0003761 A1 | 6/2001 | Ishibashi et al. |
| 2001/0024354 A1 | 9/2001 | Mori et al. |
| 2002/0128344 A1 | 9/2002 | Fujihira et al. |
| 2002/0132951 A1 | 9/2002 | Ibaragi et al. |
| 2002/0138154 A1 | 9/2002 | Li et al. |
| 2003/0056966 A1 | 3/2003 | Mori et al. |
| 2003/0216496 A1 | 11/2003 | Mohanty et al. |
| 2004/0034121 A1 | 2/2004 | Nozaki et al. |
| 2004/0242803 A1 | 12/2004 | Ohme et al. |
| 2006/0100313 A1 | 5/2006 | Tanaka et al. |
| 2006/0142421 A1 | 6/2006 | Ihara et al. |
| 2006/0194899 A1 | 8/2006 | Ohashi et al. |
| 2008/0071015 A1 | 3/2008 | Kiuchi et al. |
| 2008/0108742 A1 * | 5/2008 | Miyamoto et al. ............ 524/451 |
| 2008/0194739 A1 * | 8/2008 | Yamashita et al. .............. 524/77 |
| 2009/0311511 A1 | 12/2009 | Obuchi et al. |
| 2010/0066217 A1 | 3/2010 | Fujikawa et al. |
| 2010/0207497 A1 | 8/2010 | Kawasaki |
| 2011/0101566 A1 | 5/2011 | Yamashita et al. |
| 2011/0263762 A1 | 10/2011 | Matsuno et al. |
| 2013/0040086 A1 * | 2/2013 | Yamashita ................... 428/36.4 |
| 2013/0169127 A1 * | 7/2013 | Nagashima et al. ........ 312/223.1 |
| 2013/0203923 A1 * | 8/2013 | Yamashita ................... 524/416 |

FOREIGN PATENT DOCUMENTS

| | | |
|---|---|---|
| CN | 1107486 A | 8/1995 |
| EP | 1213111 A2 | 6/2002 |
| EP | 1609820 A1 | 12/2005 |
| JP | 517124 | 1/1993 |

(Continued)

OTHER PUBLICATIONS

Serisawa et al., "Development of Kenaf-Fiber-Reinforced Poly(lactic acids)," Proceedings of the 14th Annual Meeting of the Japan Society of Polymer Processing, pp. 161-162, 2003 (with English translation).

(Continued)

*Primary Examiner* — Nathan M Nutter

(74) *Attorney, Agent, or Firm* — McDermott Will & Emery LLP

(57) ABSTRACT

An outer casing for an electric device which is a molded article of a environmental resin wherein poly(lactic acid) and/or a lactic acid copolymer is used, is constituted by molding a flame-retarded resin composition including a resin component containing poly(lactic acid) and/or the lactic acid copolymer as a main ingredient, and silica-magnesia catalyst particles as a flame retardance-imparting component which imparts flame retardance, wherein the content of the silica-magnesia catalyst particles is 0.5% by weight or more and 9.0% by weight or less of the total weight of the flame-retarded resin composition. The silica-magnesia catalyst particles preferably have an average particle diameter of 10 μm or less.

14 Claims, 5 Drawing Sheets

(56) References Cited

FOREIGN PATENT DOCUMENTS

| | | |
|---|---|---|
| JP | 11302424 | 11/1999 |
| JP | 2001152030 A | 6/2001 |
| JP | 2001-244645 A | 9/2001 |
| JP | 2001329110 A | 11/2001 |
| JP | 2002-173583 A | 6/2002 |
| JP | 2003054990 A | 2/2003 |
| JP | 2003-292796 A | 10/2003 |
| JP | 2004277706 A | 10/2004 |
| JP | 2007-056088 A | 3/2007 |
| JP | 2007077368 A | 3/2007 |
| JP | 2007-154002 A | 6/2007 |
| JP | 2007-230851 A | 9/2007 |
| JP | 2009-173803 A | 8/2009 |
| JP | 2010-209313 A | 9/2010 |
| JP | 2010-209321 A | 9/2010 |
| KR | 2004039681 | 5/2004 |
| WO | 2004/022650 A1 | 3/2004 |
| WO | 2004090034 A1 | 10/2004 |
| WO | WO-2006/054493 A1 | 5/2006 |
| WO | 2010053167 A1 | 5/2010 |

OTHER PUBLICATIONS

International Search Report mailed Dec. 13, 2011 issued in corresponding International Application No. PCT/JP2011/004906.
Notification of Transmittal Translation of the International Preliminary Report on Patentability (Chapter I or Chapter II) (PCT/IB/338) issued in International Application No. PCT/JP2011/004906 mailed Sep. 12, 2013.
United States Office Action issued in U.S. Appl. No. 13/005,193 mailed Nov. 5, 2013.
Notification of Transmittal Translation of the International Preliminary Report on Patentability (Chapter I or Chapter II) (PCT/IB/338) issued in International Application No. PCT/JP2011/004907 mailed Sep. 6, 2013.
International Search Report issued in corresponding International Application No. PCT/JP2011/004907 with Full English Translation mailed Dec. 13, 2011.
International Search Report issued in corresponding International Application No. PCT/JP2012/002865 mailed Jun. 26, 2012.
International Search Report issued in corresponding International Application No. PCT/JP2012/004626 mailed Oct. 23, 2012.
Papazoglou, E. Chapter 4: Flame Retardants for Plastics, Handbook of Building Materials and Fire Protection, 2004, McGraw-Hill Professional, 1st edition, pp. 4.1 to 4.88.
Analysis and Characterization of High-Purity Talc for Use in Propellants: Determination of Talc in Prepellants. Dec. 1975.
Definition of molecule. The Free Dictionary. Http://www.thefreedictionary.com/molecule. As reviewed on Jun. 25, 2013.
Chinese Office Action with English Translation issued in Chinese Patent Application No. 2011/100420790 dated Jun. 6, 2012.
European Search Report issued in European Patent Application No. 10188452.6-2102 2102 dated May 6, 2011.
European Search Report issued in European Patent Application No. EP 05 805 898.3 dated Aug. 17, 2009.
United States Office Action issued in U.S. Appl. No. 13/780,699 mailed Jul. 12, 2013.
United States Office Action issued in U.S. Appl. No. 13/781,700 mailed Jul. 17, 2013.
United States Office Action issued in U.S. Appl. No. 11/791,174, filed Jan. 27, 2012.
United States Office Action issued in U.S. Appl. No. 11/791,174, filed May 18, 2011.
United States Office Action issued in U.S. Appl. No. 11/791,174, filed Feb. 15, 2011.
United States Office Action issued in U.S. Appl. No. 13/005,193 mailed May 18, 2011.
United States Office Action issued in U.S. Appl. No. 13/005,193 mailed Mar. 15, 2012.
United States Office Action issued in U.S. Appl. No. 13/005,193 mailed Jan. 2, 2013.
United States Office Action issued in U.S. Appl. No. 13/781,700 mailed Dec. 9, 2013.
Notice of Allowance issued in U.S. Appl. No. 13/005,193 mailed Feb. 19, 2014.

* cited by examiner

OUTER CASING AND METHOD FOR PRODUCING THE SAME

BACKGROUND OF THE INVENTION

1. Field of the Invention

The present disclosure relates to an outer casing and a resin molded article, which are used in electric devices, for example, electric appliances such as thin, lightweight and flat display devices, and common electric components such as resistors and speakers.

2. Description of the Related Art

As flat display devices, liquid crystal displays, organic EL displays, plasma displays and the like are produced in a commercial basis. Since liquid crystal displays and plasma displays in particular are thin and capable of displaying on large screens, they have become widely and commonly used as displays in public facilities and the like, in addition to ordinary households.

In cases of such display devices, molded articles are employed as their outer casings so as to meet design requests and to make them lighter. With these display devices becoming widely used, there is being posed, as a problem, disposal treatment of resin molded articles when spent devices are disposed of.

Recently, attention has been directed to resins (or plastics) which decompose by bacterial action when they are buried in the ground. These resins, which are called biodegradable resins (or plastics), have characteristics of being degraded into water ($H_2O$) and carbon dioxide ($CO_2$) in the presence of aerobic bacteria. Biodegradable resins are in practical use in the field of agriculture and also in practical use, for example, as packaging materials for disposable articles and as materials of compostable garbage bags.

Articles using biodegradable resins, for example, when used in the field of agriculture, may be advantageous also to users because spent plastics do not need to be collected. Further, in recent days, plant-derived resins are also receiving attention in the fields of electronic devices and automobiles. Plant-derived resins are obtained by polymerization or co-polymerization of monomers obtained from plant materials. Plant-derived (or plant-based) resins receive attention as earth-conscious resins, for example, for reasons that they can be produced without relying on petroleum resources, that plants used as raw materials grow absorbing carbon dioxide, and that their combustion calories are generally low and the amount of generated $CO_2$ is small even when their disposal is performed by incineration. Plant-derived resins are generally biodegradable, but do not necessarily need to be biodegradable when considered only from a viewpoint of preventing the depletion of petroleum resources. From this, resins which contribute to environmental protection will include, in addition to biodegradable resins, plant-derived resins which are not biodegradable. Hereinafter, these resins are referred to collectively as "environmental resins".

At present, resins which are in use as environmental resins are divided into three main classes: those based on poly(lactic acid) (hereinafter, sometimes referred to as "PLA"), on PBS (polybutylene succinate (a copolymeric resin of 1,4-butanediol and succinic acid)), and on PTE (modified polyethylene terephthalate).

Among these resins, PLAs can be produced by chemical synthesis in which sugars generated by plants such as corns or sweet potatoes are used as raw materials, and have a possibility of industrial production. Plastics containing such plant-derived resins are referred to as bioplastics. Particular attention is paid to PLAs because mass production of PLAs has been begun using corns as raw material, and thus there is a desire to develop a technology by which PLAs can be applied not only to applications requiring biodegradation properties, but also to a wide variety of applications.

As methods for improving characteristics of such environmental resins, there were proposed methods by which other components were incorporated into them. For example, JP-A 2002-173583 proposes that synthetic mica is incorporated into PLA in the order of 0.5% to 20% by weight, in order to improve the heat resistance of PLA.

In addition, there was reported the possibility of applying of PLAs to personal-computer outer casings by incorporating kenaf fibers into PLAs (Serizawa et al., "Development of Kenaf-Fiber-Reinforced Poly(lactic acids)," Proceedings of the 14th Annual Meeting of the Japan Society of Polymer Processing, pp. 161-162, 2003). Specifically, it was reported that after molding PLA resins having kenaf fibers incorporated therein, the addition of an annealing step resulted in an improved heat resistance of the PLA resins, thereby leading to a higher possibility of applying PLAs to personal-computer outer casings.

SUMMARY OF THE INVENTION

However, the resin compositions described in the above-mentioned JP-A 2002-173583 and Serizawa et al. are proposed for the purpose of improving heat resistance, and none of these documents mentions imparting of flame retardance to the resin compositions which is absolutely necessary for applying them to outer casings of electric devices represented by home appliances. Actually, the resin compositions described in the above-mentioned documents do not have flame retardance. Thus, none of the PLA compositions which have been proposed in the past can be applied to outer casings of electric devices such as television sets having high-voltage parts in their inside. In addition, recent electric devices emphasize safety and there is a tendency to employ flame-retarded resins even in cases of electric devices having no high-voltage elements in their inside. Therefore, even though environmental resins have characteristics satisfactory in stiffness, impact strength, heat resistance and the like, their usefulness will be extremely low unless they have flame retardance.

The present disclosure to provide a molded article of the environmental resin as an outer casing for an electric device, wherein flame retardance is imparted to an environmental resin, such as poly(lactic acid) (PLA) and/or a lactic acid copolymer.

The present disclosure provides an outer casing for an electric device, which is obtained by molding a flame-retarded resin composition including a resin component containing 50% by weight or more of poly(lactic acid) and/or a lactic acid copolymer, and silica-magnesia catalyst particles as a flame retardance-imparting component which imparts flame retardance, wherein the content of the silica-magnesia catalyst particles is 9.0% by weight or less of the total weight of the flame-retarded resin composition.

The present disclosure also provides a resin molded article, which is obtained by molding a flame-retarded resin composition including a resin component containing 50% by weight or more of poly(lactic acid) and/or a lactic acid copolymer, and silica-magnesia catalyst particles as a flame retardance-imparting component which imparts flame retardance, wherein the content of the silica-magnesia catalyst particles is 9.0% by weight or less of the total weight of the flame-retarded resin composition.

According to the present disclosure, it is possible to add flame retardance to environmental resins which are earth-conscious and preferably biodegradable and furthermore to adequately ensure the moldability of the resins. Thus, environmental resins can be employed to compose an outer casing 5 for an electric device.

DETAILED DESCRIPTION OF THE INVENTION

One embodiment of an outer casing for an electric device according to the present disclosure will be described with reference to the accompanying drawings. The unnecessarily detailed explanation, however, may be omitted. For example, detailed explanation for well-known matters and overlapping explanation for substantially the same construction may be omitted. This is for avoiding the following description being unnecessarily long and facilitating those skilled in the art to understand the following description.

It should be noted that the present inventor provides the attached drawings and the following description such that those skilled in the art understand the present disclosure sufficiently, and these are not intended to limit the subject matters described in the claims.

Figure 1:
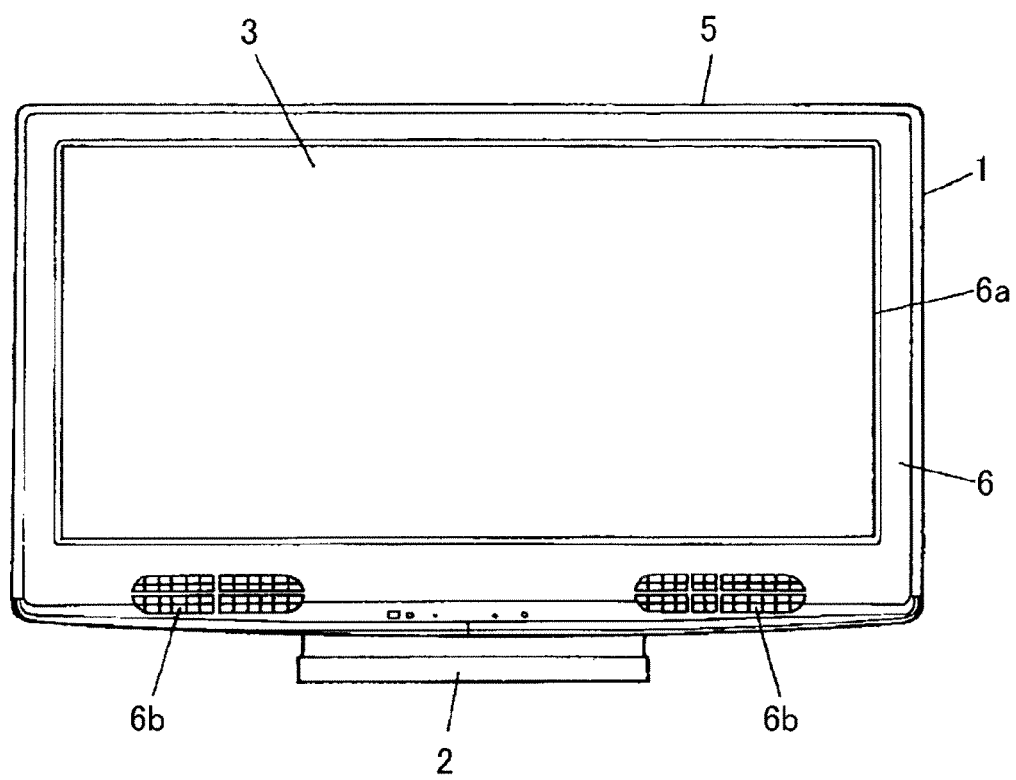
FIG. 1 is a front elevation view showing the appearance of a liquid crystal display device as an example of electric devices according to an embodiment.
Figure 2:
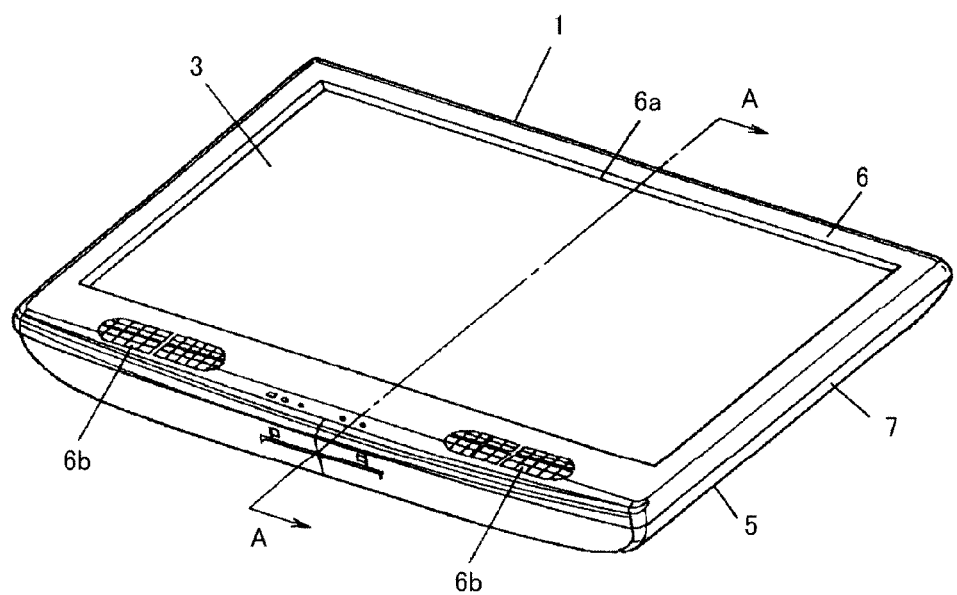
FIG. 2 is a perspective view showing a state where a stand is removed in the liquid crystal display device shown in FIG. 1.
Figure 3:
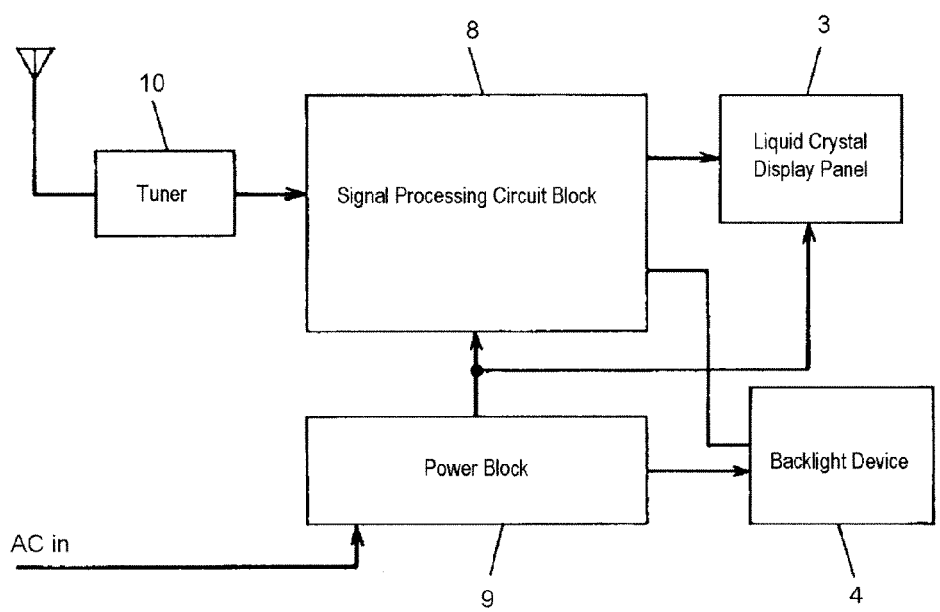
FIG. 3 is a block diagram showing circuit blocks in the whole configuration of the liquid crystal display device shown in FIG. 1.

FIGS. 1 and 2 are a front elevation view and a perspective view showing the appearance of a liquid crystal display device as an example of electric device according to an embodiment, respectively. FIG. 3 is a block diagram showing circuit blocks in the whole configuration of the liquid crystal display device, and FIG. 4 is a plane view showing an example of layout of the circuit blocks of the liquid crystal display device with the back cabinet being removed to explain the example of layout.

As shown in FIGS. 1 and 2, a liquid crystal display device has a display device body 1 and a stand 2 for retaining the display device body 1 in a state allowing it to stand up. The display device body 1 is made up by placing a display module consisting of a liquid crystal display panel 3, which is a flat display panel, and a backlight device (not shown in FIGS. 1 and 2) into an outer casing 5 of a resin molded article or the like. The outer casing 5 is composed of a front cabinet 6 with an opening 6a provided therein so as to conform to the image display area of the liquid crystal display panel 3; and a back cabinet 7 to be combined with the front cabinet 6. 6b refers to a speaker grille for releasing sounds emanated from a speaker to the outside.

Figure 4:
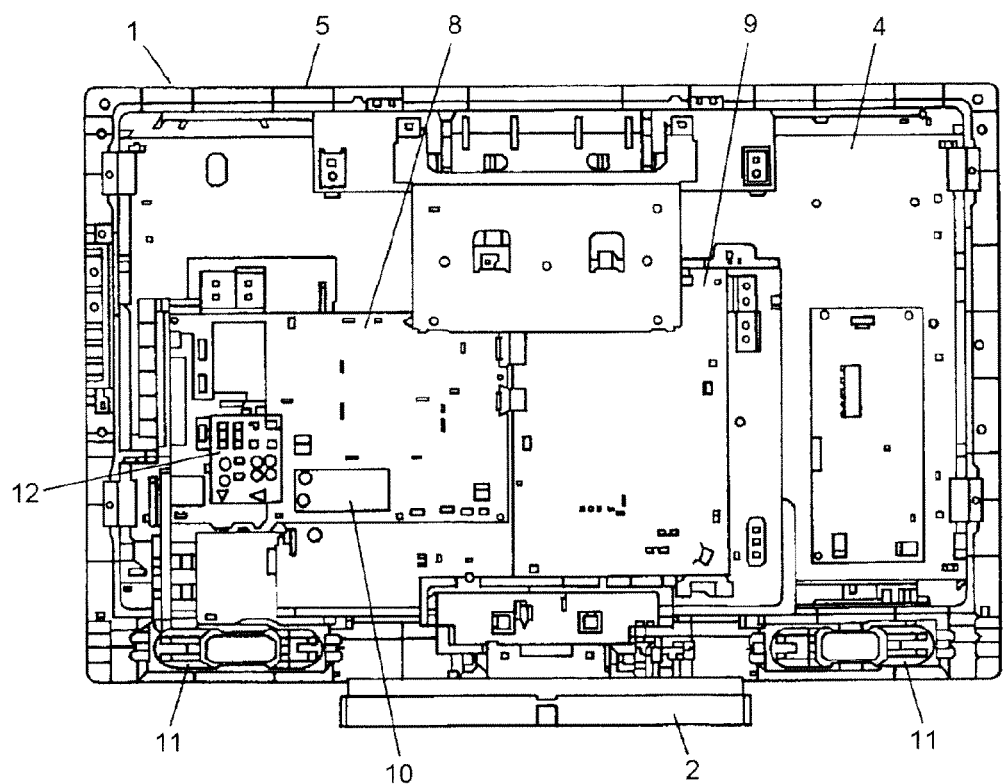
FIG. 4 is a plane view showing an example of layout of the circuit blocks of the liquid crystal display device shown in FIG. 1 with the back cabinet being removed to explain the example of layout.

As shown in FIGS. 3 and 4, a rough configuration of the whole liquid crystal display device has a signal processing circuit block 8 comprising a driving circuit for displaying images on a liquid crystal display panel 3 and a lighting control circuit for controlling lighting of a backlight device 4; a power block 9 for supplying source voltages to the liquid crystal display panel 3, the backlight device 4, and the signal processing circuit block 8; a tuner 10 for receiving television broadcasting to provide the received signal to the signal processing circuit block 8; and a speaker 11 for outputting sound. The signal processing circuit block 8 and the power block 9 are both made by mounting the parts composing the circuit on a circuit board. The circuit board on which the signal processing circuit block 8, the power block 9, the tuner 10 and the like have been mounted is fixed such that it is positioned in the space between the back side of the backlight device 4 and the back cabinet 7.

In FIG. 3, a speaker is omitted. In FIG. 4, reference numeral 12 refers to external signal input terminals for inputting image signals from external devices, such as DVD players, to the liquid crystal display device and is mounted in the signal processing circuit block 8.

The present disclosure is directed to an outer casing for a display device such as the liquid crystal display device as described above, or other electric device, which is obtained by molding a flame-retarded resin composition including a resin component containing, as a main ingredient, 50% by weight or more of poly(lactic acid) and/or a lactic acid copolymer, and silica-magnesia catalyst particles as a flame retardance-imparting component which imparts flame retardance, wherein the content of the silica-magnesia catalyst particles is 9.0% by weight or less of the total weight of the flame-retarded resin composition.

The present inventor has found that silica-magnesia catalyst particles, which is one used in purification, cracking, synthesis, or reforming of hydrocarbons, were able to impart a high degree of flame retardance to poly(lactic acid) and/or a lactic acid copolymer. The present inventor performed experiments concerning the content of silica-magnesia catalyst particles. From results of the experiments, it was found that when the content of silica-magnesia catalyst particles was 9.0% by weight or less of the total amount of the flame-retarded resin composition, high flame retardance was able to be imparted to environmental resins and the moldability of the resins was also able to be sufficiently ensured, enabling fabrication of an outer casing for electric devices. The present disclosure has been made on the basis of these findings obtained by the present inventor.

As used herein, "flame retardance" refers to properties by which the combustion does not continue or no afterglow is brought about when the source of ignition is removed. As used herein, "flame retardance-imparting component" which imparts flame retardance refers to a component which makes a resin flame-retardant by its addition thereto. Silica-magnesia catalyst particles as the flame retardance-imparting component used in the present disclosure are a catalyst which is used in purification, cracking, synthesis, and/or reforming of hydrocarbons and which is in the form of compounds that do not contain halogens at all or are difficult to generate dioxins. In the present disclosure, a catalyst as the flame retardance-imparting component exerts effects characteristic of the catalyst during the combustion reactions of the resin component in the process where the resin component actually burns, when the catalyst and the resin component are kneaded in advance, thereby to disperse the catalyst into the resin component. These catalytic effects significantly contribute to making the resin flame-retardant.

When the silica-magnesia catalyst particles are subjected to high temperatures (for example, in the order of 500° C. or higher) during combustion, the silica-magnesia catalyst particles cut macromolecules, which are of the resin component, from their ends, thereby decomposing them into lower molecular-weight molecules. If the molecular weights of molecules after the decomposition are small, then the total molecular weight of the flammable gases belching by thermal decomposition is decreased, whereby making the resin component flame-retardant would be achieved. In general, the combustion of a resin continues by the combustion cycle that the energy which is generated when molecules produced by thermal decomposition of the resin during the combustion are burned is provided to the resin as radiation heat, which causes further thermal decomposition of the resin and combustion of molecules produced by the decomposition. If the molecular weight of molecules produced by decomposition of a resin is larger, and thus more gases as fuel are supplied, then the energy of combustion will become higher. In addition, as the energy of combustion becomes great, the radiation heat in the combustion field is increased and the combustion of the resin lasts for a longer period of time. Therefore, when a resin is cut at the same number of times, decomposing of the resin into molecules with smaller molecular weights is preferable in that the energy of combustion is decreased and the thermal decomposition of the resin is suppressed. Silica-magnesia catalyst particles would exert catalytic effects so as to decompose a resin into molecules with smaller molecular weights during the combustion of the resin. This flame-proofing mechanism is different from those of halogen-based and phosphorus-based flame retardants. For example, in the case of halogen-based flame retardants represented by bromine-based flame retardants, halogen-containing gas components generated by thermal decomposition capture radicals released from a resin in the vapor phase, thereby suppressing combustion reactions. It is said that the phosphorus-based flame retardants facilitate the formation of a carbonized (char) layer, which blocks oxygen and radiation heat, thereby suppressing the combustion.

The flame-retarded resin composition which composes the outer casing for an electric device according to the present disclosure will be described in more detail below.

First, the resin component will be described.

The flame-retarded resin composition which composes the outer casing contains poly(lactic acid) (PLA) and/or a lactic acid copolymer as the resin component. PLA and the lactic acid copolymer are a resin which is obtained by using lactic acid as raw material and polymerizing it or co-polymerizing it with other monomer(s). Lactic acid can be obtained, for example, by fermentation of starch or sugars which are obtained from corns, sweet potatoes, or the like. Therefore, PLAs and lactic acid copolymers can be supplied as plant-derived resin. Many of PLAs and lactic acid copolymers have biodegradation properties. Therefore, PLAs and lactic acid copolymers are environmental resins.

PLAs and lactic acid copolymers, particularly PLAs, have superior transparency and stiffness, and thus molded articles formed from these resins can be used for various applications. On the other hand, PLAs and lactic acid copolymers have disadvantages of exhibiting decreased heat resistance and impact resistance and a slightly decreased injection moldability. For these reasons, PLAs and lactic acid copolymers are preferably used in mixture with other resin(s) and/or modifier(s), particularly when they are injection molded. For example, since PBSs have superior heat resistance and are biodegradable per se, they are suitable for mixing into PLAs and lactic acid copolymers. Alternatively, PLAs and lactic acid copolymers may be modified using agents which are commercially available as poly(lactic acid) modifiers.

Poly(lactic acid) may be one known in the art. For example, poly(lactic acid) may include a poly(L-lactic acid) consisting of the L-lactic acid unit; a poly(D-lactic acid) consisting of the D-lactic acid unit; a mixture containing poly(lactic acid) stereo-complex formed by mixing poly(L-lactic acid) and poly(D-lactic acid); or a poly(lactic acid) block copolymer obtained by solid polymerization of this mixture.

A lactic acid copolymer is a copolymer which is obtained, for example, by co-polymerizing L-lactide and/or D-lactide made from L-lactic acid and/or D-lactic acid and an oxyacid, lactone, dicarboxylic acid, or polyhydric alcohol co-polymerizable therewith (for example, caprolactone or glycolic acid).

The outer casing contains PLA and/or the lactic acid copolymer as the resin component, wherein PLA and/or the lactic acid copolymer accounts for 50% by weight or more of the total weight of the resin component as the main ingredient. The outer casing wherein PLA and/or the lactic acid copolymer constitutes 50% by weight or more of the whole resin component is capable of its easy disposal. PLA and the lactic acid copolymer are a polymer of which flame retardance tends to be improved by addition of silica-magnesia catalyst particles, in comparison with other polymers. Therefore, the flame retardance-imparting effect of the silica-magnesia catalyst particles can be favorably given when 50% by weight or more of the whole resin component is constituted by PLA and/or the lactic acid copolymer, resulting in the reduction in the proportion of the added flame retardance-imparting component. PLA and/or the lactic acid copolymer accounts for preferably 60% by weight, more preferably 70% by weight or more, further more preferably 80% by weight or more, particularly preferably 85% by weight or more, most preferably 90% by weight or more of the resin component, and optionally 100% by weight (that is, only PLA and/or the lactic acid copolymer may be contained as the resin component).

In the outer casing, PLA and/or the lactic acid copolymer accounts for preferably 70% by weight or more, 80% by weight or more, or 85% by weight or more, or most preferably 90% by weight or more, of the flame-retarded resin composition. When PLA and/or the lactic acid copolymer accounts for 70% by weight or more of the flame-retarded resin composition, the resin composition can be disposed of with ease. Other ingredients than PLA and/or the lactic acid copolymer in the flame-retarded resin composition are other resin ingredient(s), a flame retardance-imparting component as described below, an optionally added additive(s) and the like.

In the outer casing, the resin component containing poly (lactic acid) as the main ingredient may contain other resin(s). Specifically, in the outer casing, the resin component of which the main ingredient is poly(lactic acid) and/or the lactic acid copolymer may include one or more resins selected from:

a thermoplastic resin, such as polyethylene, polypropylene, polystyrene, an ethylene vinyl acetate copolymer, poly (vinyl chloride), acrylonitrile-styrene (AS), an acrylonitrile/butadiene/styrene (ABS) copolymer or mixture, poly (ethylene terephthalate) (PET), and poly(butylene terephthalate) (PBT);

a thermoplastic elastomer, such as a butadiene rubber (BR), an isoprene rubber (IR), a styrene/butadiene copolymer (SBR), a hydrogenated styrene/butadiene copolymer (HSBR), and a styrene/isoprene copolymer (SIR);

a thermoplastic engineering resin, such as polyamide (PA), polycarbonate (PC), and polyphenylene ether (PPE);

a super-engineering resin, such as polyarylate (PAR) and polyether ether ketone (PEEK); and a thermosetting resin, such as an epoxy resin (EP), a vinyl ester resin (VE), polyimide (PI), and polyurethane (PU).

Silica-magnesia (SiO$_2$/MgO) catalyst particles which are a flame retardance-imparting component which imparts flame retardance will be descried below.

The silica-magnesia catalyst particles are those of a solid acid catalyst, which is prepared, for example, by hydrothermal synthesis, and is a double oxide of silicon oxide (silica) and magnesium oxide (magnesia) or a catalyst which is formed by binding both silicon oxide (silica) and magnesium oxide (magnesia). The silica-magnesia catalyst particles function as a catalyst which decomposes hydrocarbons at the time of burning of resin composition, for example, under elevated temperatures of about 500° C. or higher, as described above. On the other hand, metal oxides or mineral materials containing metal oxides (for example, talc) which are used as filler, do not exhibit any catalytic effects even under such elevated temperatures. Therefore, the silica-magnesia catalyst particles are distinguished from such metal oxides or mineral materials.

In the outer casing, it is preferable that silica—the magnesia catalyst particles in a state having no crystal water form a mixture with the resin component. In some cases, the silica-magnesia catalyst particles having crystal water are able to impart little or no flame retardance to the resin component. When a composition or compound (including a double oxide) containing silica and magnesia contains crystal water, its chemical formula may be represented by that having a hydroxyl group. It is preferable, from a viewpoint of imparting good flame retardance, that the silica-magnesia catalyst particles which are contained in the outer casing according to the present disclosure are those which do not have such a hydroxyl group(s). Therefore, the silica-magnesia catalyst particles which are contained in the outer casing according to the present disclosure are preferably those which do not have hydrogen atoms composing crystal water or a hydroxyl group in the molecule.

It is preferable to use silica-magnesia catalyst particles having a percent MgO of 10% to 50% by weight. If the percent MgO of a catalyst is less than 10% by weight, the particles do not exhibit sufficient catalytic effects, that is, the particles have a weak action of decomposition of the resin, resulting in a tendency to reduce the effect of imparting flame retardance. On the other hand, if the percent MgO of a catalyst is 50% by weight or more, the particles may exhibit too strong catalytic effects, thereby decomposing the resin into higher molecular-weight molecules, resulting in the increase in the amount of combustion heat and the decrease in flame-retardant effects.

It is preferable to use silica-magnesia catalyst particles having an average particle diameter of 10 μm or less. The average particle diameter is a particle size that is a median diameter D50, which is determined from particle sizes measured by a laser diffraction/scattering method. When the average particle diameter of the silica-magnesia catalyst particles is 10 μm or less, the outer casing having good flame retardance can be obtained even though the content of the particles is 9.0% by weight or less. As the average particle diameter of the silica-magnesia catalyst particles becomes decreased, the outer casing having higher flame retardance can be obtained at the same content of the particles. Therefore, the silica-magnesia catalyst particles having a smaller average particle diameter makes it possible to obtain the outer casing having a desired flame retardance (for example, grade V0 of the UL 94 Standard), even though the content of the silica-magnesia catalyst particles is decreased.

The silica-magnesia catalyst particles having an average particle diameter of 10 μm or less, for example, 1 μm or more and 10 μm or less, are obtained by pulverizing the silica-magnesia catalyst particles which have larger particle sizes. Pulverizing may be carried out, for example, by using a jet mill.

In the outer casing, the silica-magnesia catalyst particles which are a flame retardance-imparting component account for 9.0% by weight or less, preferably 0.5% by weight or more and 9.0% by weight or less, more preferably 1.0% by weight or more and 9.0% by weight or less, of the weight of the flame-retarded resin composition. When the content of the silica-magnesia catalyst particles is 9.0% by weight or less of the flame-retarded resin composition, there can be obtained flame-retarded resin compositions having good moldability and good flame retardance.

Preferable contents of the silica-magnesia catalyst particles also vary according to their average particle diameter. For example, when the average particle diameter of the silica-magnesia catalyst particles is 4 μm or more and 8 μm or less, particularly in the order of 5 μm, the flame-retarded resin composition in which a content of the silica-magnesia catalyst particles is 0.7% by weight or more and 9.0% by weight or less will exhibit a high flame retardance (grade V0 of the UL 94 Standard). Also, when the average particle diameter of the silica-magnesia catalyst particles is 2 μm or more and less than 4 μm, particularly in the order of 3 μm, the flame-retarded resin composition in which a content of the silica-magnesia catalyst particles is 0.5% by weight or more and 9.0% by weight or less will exhibit a high flame retardance (grade V0 of the UL 94 Standard). When the average particle diameter of the silica-magnesia catalyst particles is 8 μm or more and 15 μm or less, particularly in the order of 10 μm, the flame-retarded resin composition in which a content of the silica-magnesia catalyst particles is 1.0% by weight or more and 9.01 by weight or less will exhibit a high flame retardance (grade V0 of the UL 94 Standard).

Preferably, the outer casing does not substantially contain a flame retardance-imparting component other than the silica-magnesia catalyst particles. That is, in the outer casing, it is preferable that the flame retardance-imparting component substantially consists of the silica-magnesia catalyst particles. This is because the flame retardance-imparting component substantially consisting of silica-magnesia catalyst particles does not have any halogen and thus results in a reduced burden to the environment upon the disposal of the outer casing. Here, the term "substantially consisting of" is used, taking into consideration that the silica-magnesia catalyst particles may contain other substances than silica and magnesia (for example, other metal(s), oxides thereof and the like) in amounts of the order of impurities.

The flame-retarded resin composition composing the outer casing may contain other component(s) than the above-described resin component and flame retardance-imparting component. As other component(s) are included additives commonly added to resins. Additives are, for example, nucleating agents such as calcium lactate and benzoates; hydrolysis inhibitors such as carbodiimide compounds; antioxidants such as 2,6-di-t-butyl-4-methylphenol and butylated hydroxyanisole; releasing agents such as glycerin mono-aliphatic acid esters, sorbitan aliphatic acid esters, and polyglycerin aliphatic acid esters; colorings such as carbon black, ketjen black, titanium oxide, and lapis lazuli; impact absorbers such as butylene rubbers; anti-fogging agents such as glycerin aliphatic acid esters and monostearyl citrate. The content of these additives is preferably 18% by weight or less, more preferably 10% by weight or less, of the total weight of the flame-retarded resin composition.

The flame-retarded resin composition can be produced by kneading a resin component, a flame retardance-imparting component, and an additive(s) which is/are optionally added. As an example, the flame-retarded resin composition can be produced by methods in which the silica-magnesia catalyst particles are added in a kneading step wherein the resin component having poly(lactic acid) and/or the lactic acid copolymer as the main ingredient is molten and kneaded. According to this production method, another step for incorporating the flame retardance-imparting component does not take place, and thus the flame-retarded resin composition can be obtained without increasing the production cost so much.

Preferably, the silica-magnesia catalyst particles are subjected to heat treatment prior to being kneaded with the resin component. This is due to the fact that silica-magnesia catalyst particles are generally supplied in states having no catalytic activity or exhibiting a decreased catalytic activity such that no flame retardance can be imparted. Heat treatment is performed to remove crystal water from the particles. Crystal water refers to a water which coordinates or binds to an element in the molecule, a water which fills a vacant site in the crystal lattice, a water which is contained as OH ion and dehydrated as $H_2O$ upon heating, or the like, and these waters are removed by being heated at elevated temperatures. Removing crystal water from the silica-magnesia catalyst particles requires heat treatments at a temperature of 100° C. or higher, preferably at a temperature of 200° C. to 350° C. The temperature at which the resin component having poly(lactic acid) and/or the lactic acid copolymer as the main ingredient is kneaded is at the highest in the order of 260° C., and thus heat treatment for removing crystal water needs to be carried out separately before the kneading. In addition, heat treatment is preferably carried out in an atmosphere under 0.1 atm or less. Therefore, suction evacuation is preferably performed during the heat treatment.

The silica-magnesia catalyst particles from which any crystal water has been removed exhibit high activity, and thus may degrade a resin component in the course in which the particles are added to and kneaded with the resin component. For this reason, when the silica-magnesia catalyst particles are contained in large amounts, there may be caused a decreased molecular weight of the resin component and a reduced moldability. The content of the silica-magnesia catalyst particles is preferably 9.0% by weight or less also from a viewpoint of avoiding the decomposition of the resin component during kneading.

In producing a flame-retarded resin composition having, for example, pellet shape, kneading may be carried out before obtaining pellets. Alternatively, a pellet-shaped resin (or a pellet-shaped composition having two or more resins) may be kneaded with a flame retardance-imparting component, followed by forming the mixture into the shape of pellets again.

The outer casing is obtained by shaping a desired shape from the flame-retarded resin composition by injection molding, extrusion molding, or compression molding. Injection molding and extrusion molding involve a step of melting the flame-retarded resin composition produced by the previously described method and kneading it by the use of a kneader or the like. Therefore, when these molding methods are employed, adding of the flame retardance-imparting component to the resin component may be carried out in this kneading step. If the flame retardance-imparting component is added in that manner, then another step for adding the flame retardance-imparting component is not required, and thus the outer casing is obtained efficiently.

The outer casing for an electric device is used, in particular, as an outer casing for not only the above-described liquid crystal display device, but also other display devices (plasma display devices, organic EL display devices and the like), for computers, mobile phones, audio products (for example, radios, cassette decks, CD players, MD players), microphones, keyboards, and potable audio players, and for electric parts. Electric devices are not limited to ones for family use. Electric devices include ones for business use, such as industrial and medical use. A flame-retarded resin composition composing an outer casing is preferably employed also for making a resin molded article other than an outer casing for an electric device. Resin molded articles are provided, for example, as interior materials of automobiles, exterior materials of two-wheel vehicles, and various household sundry goods.

EXAMPLES

The present disclosure will be described by way of Examples.

Figure 5:
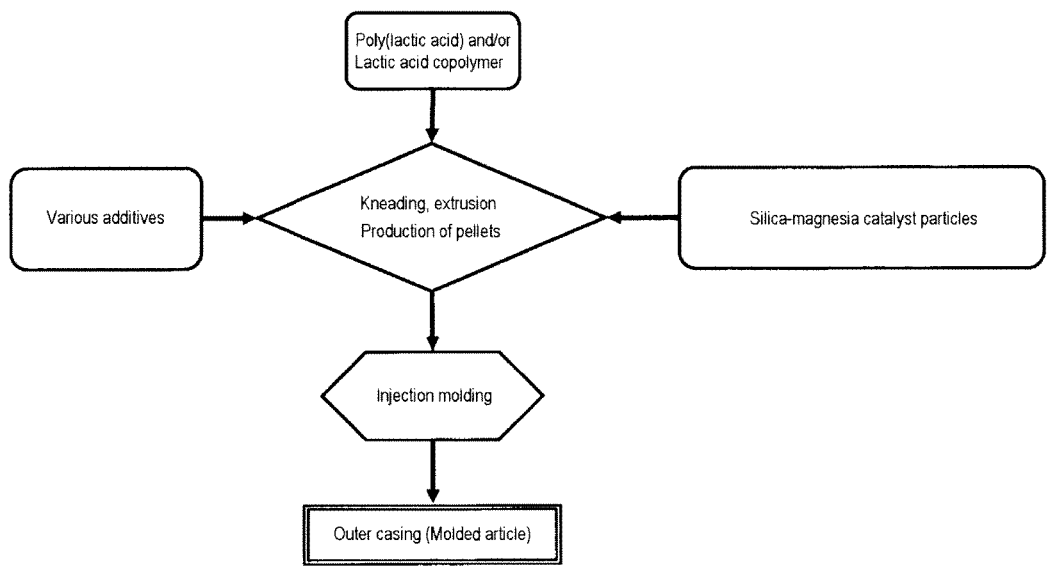
FIG. 5 is a flow diagram showing a method for producing an outer casing for an electric device according to the present disclosure.

FIG. 5 represents a flow diagram showing a method for producing an outer casing for an electric device (including the sequence of formulating a flame-retarded resin composition), which is used in the Examples.

As shown in FIG. 5, to a resin component composed of 100% by weight of poly(lactic acid) (PLA) synthesized using corn as raw material, silica-magnesia catalyst particles (MgO: 24.5% by weight) were kneaded as flame-retarder component employing a twin-screw kneader, and at the same time, additives were added: 2% by weight of carbodiimide and 0.5% by weight of each of a ketjen black pigment, Ca lactate, butylated hydroxyanisole, a glycerin mono-fatty acid ester, and a butylene rubber, relative to the total amount of a flame-retarded resin composition. After kneading, pellets were produced by extrusion molding. Kneading by the twin-screw kneader was carried out at a temperature of about 185° C. Before the kneading, the silica-magnesia catalyst particles were subjected to heat treatment at 350° C. to remove crystal water. The heat treatment was performed in an atmosphere under 0.1 atm with suction evacuation.

The pellets were used to prepare test specimens using an injection machine. The shape and dimensions of the test specimens were as follows:

Shape: specimen shape for UL 94 flammability test
Dimensions: measuring 125 mm×13 mm×2.5 mm Plural types of test specimens were prepared by varying the average particle diameter and the content of the silica-magnesia catalyst particles. Specifically, as silica-magnesia catalyst particles, those having average particle diameters of 10 µm, 5 µm, and 3 µm were prepared and the content of the catalyst particles having each of the average particle diameters was varied in the range of 0.3% by weight to 15.0% by weight. For these test specimens, the UL-94 vertical burning test was carried out to evaluate their flame retardance and the moldability of the resin compositions prepared was also assessed. The results are shown in Table 1.

The moldability of a resin composition was determined by whether or not the resin composition was capable of being formed into a desired shape by injection molding or the like using a mold and so as to have a good surface with no sinks occurring, and by whether or not the resin composition was industrially usable from a viewpoint of the time required for molding in a molding cycle or the like. The specific criteria for the evaluation were as follows:

++: a level in which there are observed no flow marks, no sinks, and no weld lines, and the molded article can be used as a finished product without coating;

+: level in which there are observed slight flow marks and sinks under careful investigation, but the molded article can be used as a finished product if coating is applied;

–: level in which the surface smoothness is poor, sinks and an orange peel are noticeable, and thus the molded article is unusable even if coating is applied.

TABLE 1

| Content of catalyst particles (wt %) | Silica-magnesia catalyst particles Average particle diameter: 10 μm | | | | Silica-magnesia catalyst particles Average particle diameter: 5 μm | | | |
|---|---|---|---|---|---|---|---|---|
| | Combustion time (sec) | Ignition of cotton wool | Determination of flame retardance | Moldability of resin composition | Combustion time (sec) | Ignition of cotton wool | Determination of flame retardance | Moldability of resin composition |
| 15.0 | 0 | None | V0 | – | 0 | None | V0 | – |
| 10.0 | 0 | None | V0 | + | 0 | None | V0 | + |
| 9.0 | 0 | None | V0 | ++ | 0 | None | V0 | ++ |
| 7.0 | 5 | None | V0 | ++ | 0 | None | V0 | ++ |
| 5.0 | 5 | None | V0 | ++ | 0 | None | V0 | ++ |
| 3.0 | 8 | None | V0 | ++ | 5 | None | V0 | ++ |
| 1.0 | 10 | None | V0 | ++ | 5 | None | V0 | ++ |
| 0.7 | 15 | Observed | V2 | ++ | 10 | None | V0 | ++ |
| 0.5 | 15 | Observed | V2 | ++ | 15 | Observed | V2 | ++ |
| 0.3 | 20 | Observed | V2 | ++ | 15 | Observed | V2 | ++ |

| Content of catalyst particles (wt %) | Silica-magnesia catalyst particles Average particle diameter: 3 μm | | | |
|---|---|---|---|---|
| | Combustion time (sec) | Ignition of cotton wool | Determination of flame retardance | Moldability of resin composition |
| 15.0 | 0 | None | V0 | – |
| 10.0 | 0 | None | V0 | – |
| 9.0 | 0 | None | V0 | ++ |
| 7.0 | 0 | None | V0 | ++ |
| 5.0 | 0 | None | V0 | ++ |
| 3.0 | 0 | None | V0 | ++ |
| 1.0 | 0 | None | V0 | ++ |
| 0.7 | 5 | None | V0 | ++ |
| 0.5 | 8 | None | V0 | ++ |
| 0.3 | 10 | None | V2 | ++ |

As shown in Table 1, grade V0 of the UL 94 Standard was accomplished when 10.0% by weight or more of the silica-magnesia catalyst particles as flame retardance-imparting component was added to the resin component consisting of only poly(lactic acid). However, the resin compositions in which the content of the flame retardance-imparting component is 10.0% by weight or more were poor in their moldability and failed to make an outer casing for electric devices. This would be because large amounts of the silica-magnesia catalyst particles are present in the resin composition and cause the resin to be decomposed, thereby resulting in a reduced molecular weight of the resin.

When the content of the silica-magnesia catalyst particles is 9.0% by weight or less, on the other hand, the moldability of the resins was sufficient. In the compositions in which the silica-magnesia catalyst particles having an average particle diameter of 10 μm were added, however, the contents of the silica-magnesia catalyst particles of 1.0% by weight or less lead to a reduced flame-retardant performance, in particular, decreased the flame-retardant performance to grade V2 of the UL 94 Standard. In the compositions in which the silica-magnesia catalyst particles having an average particle diameter of 5 μm were added, the contents of the silica-magnesia catalyst particles of 0.5% by weight or less decreased the flame retardance of the compositions to grade V2 of the UL 94 Standard. In the compositions in which the silica-magnesia catalyst particles having an average particle diameter of 3 μm were added, a flame retardance of grade V0 of the UL 94 Standard was able to be maintained even at a content of the silica-magnesia catalyst particles of 0.5% by weight.

From these, it was found that by employing the silica-magnesia catalyst particles having a small average particle diameter, a sufficient degree of flame retardance was able to be imparted even at a small content of 0.5% by weight. However, when the content of the silica-magnesia catalyst particles exceeded 9.0% by weight independently on their average particle diameter, the moldability of the resins became poor, and thus compositions which were capable of being used as an outer casing for electric devices were not obtained.

From this result, it has turned out that it is necessary to set the content of the silica-magnesia catalyst particles to 9.0% by weight or less in the case where poly(lactic acid) is used as the resin component and the silica-magnesia catalyst particles are used as the flame retardance-imparting component, thereby to obtain a flame-retarded resin composition, from which an outer casing for an electric device is obtained. It has also turned out that the lower limit value of the content of the silica-magnesia catalyst particles is dependent on their average particle diameter, and adding of the silica-magnesia catalyst particles at an amount of 1.0% by weight or more would provide a flame retardance of grade V0 of the UL 94 Standard if the particles have an average particle diameter of 10 μm or less.

As is apparent from the above-mentioned Examples, it is possible that when a flame retardance-imparting component of which the main ingredient is silica-magnesia catalyst particles is contained in a resin component of which the main ingredient is poly(lactic acid), a sufficient degree of flame retardance can be imparted without deteriorating moldability for making an outer casing for electric devices, by setting the content of the silica-magnesia catalyst particles to 9.0% by weight or less relative to the flame-retarded resin composition.

In the above-mentioned Examples, some cases have been described in which molding was done by an injection molding method by which a melted resin was injected in a mold having a predetermined shape. An outer casing for an electric device of another embodiment may be formed and produced by a compression molding method by which a melted flame-retarded resin composition is melted and placed into a female mold and pressure is applied employing the male mold and the female mold.

Since the embodiments described above are for exemplifying the techniques in the present disclosure, various changes, substitutions, additions, omissions and so on may be made within the scope of the claims and within the scope of the equivalents thereof.

The outer casing for an electric device according to the present disclosure is produced by employing environmental resins which have a small burden to the environment and possesses flame retardance, and thus is useful as an outer casing for liquid crystal displays and the like.

What is claimed is:

1. An outer casing for an electric device, which is obtained by molding a flame-retarded resin composition comprising a resin component containing 50% by weight or more of poly(lactic acid) and/or a lactic acid copolymer, and silica-magnesia catalyst particles as a flame retardance-imparting component which imparts flame retardance,
    wherein the content of the silica-magnesia catalyst particles is 9.0% by weight or less of the total weight of the flame-retarded resin composition,
    the silica-magnesia catalyst particles have an average particle diameter of 1 μm or more and 10 μm or less, and
    proportion of magnesium oxide in the silica-magnesia catalyst is from 10 wt % to 24.5 wt %.

2. The outer casing for an electric device according to claim 1, wherein the content of the silica-magnesia catalyst particles is 1.0% by weight or more and 9.0% by weight or less of the total weight of the flame-retarded resin composition.

3. The outer casing for an electric device according to claim 1, wherein the silica-magnesia catalyst particles do not have hydrogen atoms composing crystal water or a hydroxyl group in the molecule.

4. A resin molded article, which is obtained by molding a flame-retarded resin composition comprising a resin component containing 50% by weight or more of poly(lactic acid) and/or a lactic acid copolymer, and silica-magnesia catalyst particles as a flame retardance-imparting component which imparts flame retardance,
    wherein the content of the silica-magnesia catalyst particles is 9.0% by weight or less of the total weight of the flame-retarded resin composition,
    the silica-magnesia catalyst particles have an average particle diameter of 1 μm or more and 10 μm or less, and
    proportion of magnesium oxide in the silica-magnesia catalyst is from 10 wt % to 24.5 wt %.

5. The resin molded article according to claim 4, wherein the content of the silica-magnesia catalyst particles is 1.0% by weight or more and 9.0% by weight or less of the total weight of the flame-retarded resin composition.

6. The resin molded article according to claim 4, wherein the silica-magnesia catalyst particles do not have hydrogen atoms composing crystal water or a hydroxyl groups in the molecule.

7. A method for producing an outer casing for an electric device, which includes kneading a resin component containing 50% by weight or more of poly(lactic acid) and/or a lactic acid copolymer, and silica-magnesia catalyst particles and molding the kneaded mixture, the method comprising steps of:
    kneading the resin component and the silica-magnesia catalyst particles such that the content of the silica-magnesia catalyst particles becomes 9.0% by weight or less of the total weight of a flame-retarded resin composition; and
    heating the silica-magnesia catalyst particles to remove crystal water from the silica-magnesia catalyst particles before the kneading,
    wherein the silica-magnesia catalyst particles have an average particle diameter of 1 μm or more and 10 μm or less, and
    proportion of magnesium oxide in the nesia catalyst is from 10 wt % to 24.5 wt %.

8. The method for producing an outer casing for an electric device according to claim 7, wherein the heating of the silica-magnesia catalyst particles is carried out at a temperature of 100° C. or higher.

9. A method for producing a resin molded article, which includes kneading a resin component containing 50% by weight or more of poly(lactic acid) and/or a lactic acid copolymer, and silica-magnesia catalyst particles and molding the kneaded mixture, the method comprising steps of:
    kneading the resin component and the silica-magnesia catalyst particles such that the content of the silica-magnesia catalyst particles becomes 9.0% by weight or less of the total weight of a flame-retarded resin composition; and
    heating the silica-magnesia catalyst particles to remove crystal water from the silica-magnesia catalyst particles before the kneading,
    wherein the silica-magnesia catalyst particles have an average particle diameter of 1 μm or more and 10 μm or less, and
    proportion of magnesium oxide in the silica-magnesia catalyst is from 10 wt % to 24.5 wt %.

10. The method for producing a resin molded article according to claim 9, wherein the heating of the silica-magnesia catalyst particles is carried out at a temperature of 100° C. or higher.

11. The outer casing for an electric device according to claim 1, wherein the silica-magnesia catalyst particles have an average particle diameter of 2 μm or more and 10 μm or less.

12. The resin molded article according to claim 4, wherein the silica-magnesia catalyst particles have an average particle diameter of 2 μm or more and 10 μm or less.

13. The method for producing an outer casing for an electric device according to claim 7, wherein the silica-magnesia catalyst particles have an average particle diameter of 2 μm or more and 10 μm or less.

14. The method for producing a resin molded article according to claim 9, wherein the silica-magnesia catalyst particles have an average particle diameter of 2 μm or more and 10 μm or less.

* * * * *